Aug. 22, 1933.  A. HERZ  1,923,825
MOLDING FOR GROUND WIRES AND THE LIKE
Filed June 11, 1927
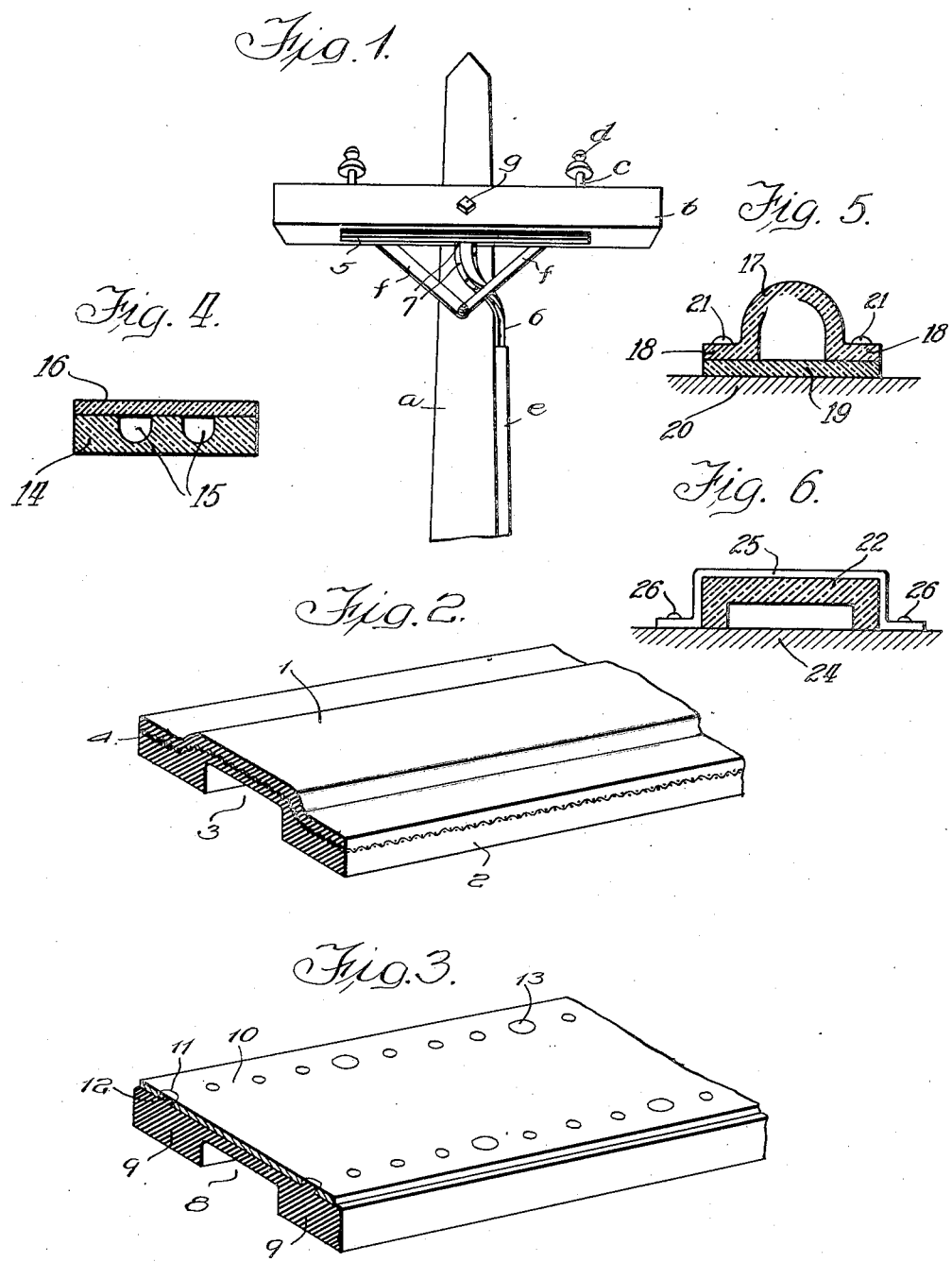

Patented Aug. 22, 1933

1,923,825

UNITED STATES PATENT OFFICE 1,923,825

MOLDING FOR GROUND WIRES AND THE LIKE

Alfred Herz, Chicago, Ill., assignor of one-half to Edmund O. Schweitzer, Chicago, Ill.

Application June 11, 1927. Serial No. 198,295

21 Claims. (Cl. 247—40)

This invention relates to molding for enclosing electrical wires, and more particularly to a molding which is especially adapted to be used for housing ground wires of electrical transmission lines, and for other purposes where the molding has to be bent or shaped out of its normal straight line condition.

It is the common practice to cover the ground wires of electrical transmission systems with a wooden molding secured to the line pole and extending from the ground surface to within a short distance of the cross-arm. This is objectionable as leaving the upper portion of the ground wire uncovered which is a constant source of danger to the lineman as, if he should touch the ground wire while working on the line wire, the latter would be grounded through his body with possibly fatal results, particularly in working on high tension lines.

One of the main objects of my invention is to provide means, such as a flexible molding which can be readily shaped to conform to the line pole, for enclosing all or the upper portion of the ground wire.

A further object of my invention is to provide a molding of this character which is properly reinforced so as to retain substantially its original shape. Further objects and advantages will appear from the detailed description.

In the drawing:

Fig. 1 is a perspective view of a line pole and cross-arm and associated parts showing a molding constructed in accordance with my invention as applied.

Fig. 2 is a perspective view of a length of the molding partly in section.

Fig. 3 is a view similar to Fig. 2 of a modified form of molding.

Fig. 4 is a cross-sectional view of a second modified form.

Fig. 5 is a cross-sectional view of a third modified form.

Fig. 6 is a cross-sectional view of a fourth modified form of molding, showing securing means therefor.

In Fig. 1 of the drawing I have illustrated a molding as applied to the upper portion of the ground wire such as is commonly used in electrical transmission lines. This is merely as being illustrative of one use of the invention and it will be understood that my molding can be used for many other purposes.

In Fig. 1, I have shown a line pole (a) adjacent to the upper end of which is secured a cross-arm (b) in a known manner. Pins (c) are secured in the cross-arm and have mounted thereon insulators (d) to which the wires (not shown) are secured. It is the present practice to connect the pins (c) by a wire extending lengthwise of the cross-arm (b) at the lower face thereof. This cross-wire is then connected by the ground wire to the ground. In accordance with the present practice this ground wire is enclosed or covered by a molding (e) of wood or the like, this molding being nailed or otherwise secured to post (a) and extending from the ground surface to within a short distance of the cross-arm (b). This serves to enclose or house the ground wire to within a short distance of the cross-arm, but leaves the upper portion of this ground wire and the wire connecting the pins (c) uncovered which is a constant source of danger to the lineman.

It is the common practice to brace the cross-arm (b) by cross braces (f) formed of suitable lengths of steel, these braces being secured at their lower ends to the pole (a) at a point in alignment with the lag screw or bolt (g) for securing the arm (b) to the pole. This renders it necessary to dispose the ground wire at the side of the pole (a) with the result that any covering or housing of this ground wire between the upper end of the molding (e) and the under face of arm (b) must be bent or curved about the pole (a) as illustrated. This renders it impossible to employ the ordinary molding for this purpose and, so far as I am aware, no satisfactory means has so far been devised for enclosing this portion of the ground wire. I have found, however, that this much to be desired result can be accomplished by avoiding a flexible molding capable of being shaped or bent to conform to the round or curvature of the pole (a) and to extend laterally from the central portion of arm (b) to the upper end of the molding (e).

In Fig. 2, I have illustrated one of the most satisfactory and simplest forms of flexible molding. This molding can be formed of any suitable material which can be readily deformed or bent and can be readily secured to a suitable support. The molding should possess mechanical strength and should be capable of resisting the elements. Preferably the molding should also be formed of electrical insulating material. I have found that soft rubber is suitable for this purpose.

In constructing the molding, however, many other materials can be used such as, for example, layers of canvas or other suitable fabrics impregnated with bitumen products etc., or it would be possible to use a moulding of material substantially hard or rigid under normal conditions but rendered flexible when heated or otherwise treated.

The rubber used is of a composition to possess appreciable mechanical strength and high electrical insulating properties, this rubber being properly cured so as to be readily flexible to be bent into desired shape while also possessing great elasticity sufficient to prevent undesirable deformation of the molding when bent at a comparatively sharp angle. This molding can be readily produced from a suitable rubber composition, by molding, and is preferably shaped to provide a central raised or arched portion 1, from which extend lateral flanges 2 forming, with the arched portion, a groove or channel 3 of U-shape in the under face of the molding. I preferably provide an insert 4 of canvas or other suitable fabric which extends transversely of the flanges 2 and across the arched portion 1, this insert providing a reenforcement for the molding and affording appreciable additional mechanical strength thereto. The insert is also of assistance in retaining the proper shape of the molding in cross-section and preventing excessive or undesirable deformation thereof when bent about a line pole or when bent at a relatively sharp angle. This molding can be readily bent in any direction to accommodate changes in direction of the surface to which it is applied.

In Fig. 1, I have illustrated a length 5 of molding which is secured to the under face of crossarm (b), this length being disposed in a straight line. Extending from the central portion of length 5 I have shown a second length 6 of molding which encloses the portion of the ground wire between the top of the molding (e) and the length of molding 5. This second piece of molding 6 is bent laterally toward the rigid molding (e) and is also bent about the pole (a) so as to conform to the curvature thereof, the lower portion of the molding 6 being then bent laterally reversely to the direction in which it was first bent. This molding, due to its flexibility and elasticity can be readily shaped to conform to the changes in direction thereof and so as to provide a continuous covering or conduit, in conjunction with pole (a), which very effectually encloses the ground wire between the rigid conduit (e) and the molding 5. The length of wire connecting the insulator pins (c) to which the ground wire proper is connected, is enclosed by the molding 5. In this manner the upper portion of the ground wire, including the wire connecting the insulator pins, is enclosed in such a manner as to eliminate all possibility of a lineman accidentally coming in contact with such wire. This very effectually eliminates what is at present a constant source of danger to the lineman. In applying the molding it is secured in position by nails 7, or other suitable securing elements, driven through the flanges 2 into the wooden pole (a). These nails are applied at suitable intervals and as the molding is bent laterally and about the pole, thus assisting in bending or shaping of the molding which is comparatively soft so that the nails can be easily driven through the flanges 2. The straight piece of molding 5 is secured to the arm (b) in the same manner. The flanges 2 and 4 are relatively wide in comparison to their thickness, thereby tending to avoid lateral tilting of the flanges when nails are driven therethrough.

In Fig. 3 I have illustrated a modified form of molding which is of substantially uniform cross section and includes the central U-shaped channel 8 and the lateral flanges 9. A reinforcement 10 is mounted on the outer face or back of this molding. This reinforcement is in the form of a strip of soft brass, lead, or other suitable material which is provided with a plurality of spaced openings 11 of inverted frusto-conical shape, these openings receiving elements 12 extending from the molding, which elements serve as keys to secure the member 10 to the outer face of the molding. As will be readily understood, these key elements are pressed into the openings 11 and formed therein during the process of forming the molding. The reinforcement or strip 10 is provided with a plurality of larger openings 13 which are suitably spaced for reception of securing nails which are driven through these openings and through the flanges 9. This molding is adapted to be used in the same manner and for the same purpose as the molding illustrated in Figs. 1 and 2 and due to the fact that the reinforcement 10 is of soft metal, the molding can be readily bent to conform to rounded surfaces or to changes in direction of the wires to be enclosed by the molding. The reinforcing strip 10 is of value as reducing the possibility of the heads of the nails or other securing elements used pulling through the flanges of the molding after continued use. This strip is also of value as providing a mechanical reinforcement of the molding and as protecting it from the elements. While the molding of Fig. 2 is very satisfactory under ordinary conditions, I find that the molding of Fig. 3 is particularly well adapted where such a molding is subjected to unusually severe usage. In both Figures 2 and 3, as well as in Figures 4 and 5 described below, the form of the molding is generally rectangular in cross section.

In the form illustrated in Fig. 4, the molding 14 is of rectangular cross-section and is provided with parallel grooves 15 in its upper face for reception of the electric wires. A cover plate or strip 16 also of insulating material is secured over the top or open side of the grooves to form a cover therefor and to reinforce the molding 14. This form of molding is very similar to the wooden molding formerly used in interior wiring work and discarded as unsafe, and is particularly well adapted for interior wiring where it is not feasible to place the wires in concealed conduits, and the direction of the molding frequently changes as at corners of the room, to pass over obstructions, etc.

In Fig. 5 I have shown the molding 17 as of arcuate cross-section with lateral flanges 18 at its lower open base portion. These flanges seat upon a closure strip 19 of suitable insulating material. This molding is intended more particularly for use in cases where a wire or conductor is to be supported on a metallic or other electrical conducting surface. The closure strip 19 is placed against the supporting surface 20 with flanges 18 on top of the strip, after which the flanges and the strip 19 are secured together and to support 20 by screws 21 passing through the flanges and the strip and threading into the support, or in any other suitable or preferred manner. With the parts disposed in this manner the wire is effectively housed within the molding and completely insulated from support 20. This effectually eliminates possibility of the wire becoming grounded to the support.

The molding 22, illustrated in Fig. 6, is of rectangular cross-section with a rectangular groove or recess in its under face. This molding is intended to be secured to a suitable support 24 by means of straps 25 passing about the molding and secured to the support by screws 26 or equivalent means. The molding and the support co-operate to provide a housing which encloses the wire or conductor within the molding.

The moldings of the various forms illustrated are all capable of being bent both transversely and from front to back to conform to the contour of the supporting surface to which the molding is applied. When used for interior work the molding is preferably finished to match the finish of the room in which it is used. This renders the molding inconspicuous and produces a neat and finished appearance. While the forms of molding illustrated in Figs. 4 to 6 are shown as being of homogeneous construction, these forms can also be provided with suitable reinforcements or inserts, as will be readily understood.

As will be understood, and as above indicated, changes in construction and arrangement of parts of the invention may be resorted to without departing from the field and scope of the same, and I intend to include all such variations, as fall within the scope of the appended claims, in this application in which the preferred forms only of my invention are disclosed.

What I claim is:—

1. As a new article of manufacture, a flexible molding comprising electrical insulating material and a reinforcing plate secured to the insulating material.

2. As a new article of manufacture, a substantially rectangular molding of flexible material, and a reinforcement secured to said molding.

3. As a new article of manufacture, a molding of soft rubber having lateral nailing flanges of sufficient width relative to their thickness to avoid lateral tilting of said flanges when driving securing nails therethrough.

4. In combination, a soft rubber molding, and a metallic reinforcement secured to the molding said molding including lateral portions adapted for reception of securing members driven therethrough.

5. In combination, a soft rubber molding, and a metallic backing keyed to the molding and provided with spaced nail receiving openings.

6. As an article of manufacture, a molding of resilient insulating material having a groove therein for the reception of a conductor, and a reinforcing plate secured to the molding.

7. As an article of manufacture, a molding of resilient insulating material, and a metallic reinforcing plate secured thereto, said plate having a number of openings therein through which the insulating material extends.

8. In an electrical transmission system embodying a conductor adapted to carry a current of electricity and a pole and cross arm structure for supporting said conductor, the combination of a ground conductor extending from the ground to a point on the cross arm adjacent said conductor, and flexible insulating means for the portion of said ground conductor extending from a point on the cross arm to a point on the supporting pole.

9. In an electrical transmission system embodying a conductor and a pole and cross arm supporting structure therefor, the combination of a ground conductor extending from the ground to a point on the cross arm, flexible insulating means for at least a portion of said ground conductor extending from a point on the supporting pole, said insulating means being so formed that it may be applied to the ground conductor after the latter has been connected, and fastening means for the insulating material.

10. In an electrical transmission system embodying an electrical conductor adapted to carry a current and a supporting pole for the conductor, the combination of an exposed grounding wire extending from the ground to a point on the pole adjacent said conductor, rigid insulating means covering said wire for a portion of its length, and flexible insulating means covering the grounding wire for another portion of its length.

11. In an electrical system including a conductor adapted to carry a current and a pole and cross arm structure for supporting said conductor out of contact with the ground the combination of a ground wire extending along the cross-arm structure from a point adjacent said conductor to the pole, thence down the pole to the ground, and flexible insulating means secured to the pole and cross arm and having a longitudinal groove to receive the ground wire thereby covering and protecting the portion of said ground wire extending from the pole to the cross arm.

12. In a ground wire system for electric lines employing elevated conductors and supports therefor, an insulation for the upper end of the ground wire comprising a flexible molding adapted to enclose the wire and conform to the surface of the supports, and means passing through the molding for securing it to said supports.

13. In an electrical transmission system, the combination with a ground conductor of an enclosing and insulating molding formed of flexible material and having an open sided conductor receiving recess in which said ground conductor is disposed.

14. As a new article of manufacture, a molding of flexible insulating material having lateral nailing flanges of substantial width.

15. In combination, a molding formed of flexible insulating material, and a metallic reinforcement secured to the molding, said molding including lateral portions adapted for reception of securing members passing therethrough.

16. In combination, a molding formed of flexible insulating material, and a metallic backing keyed to the molding and provided with spaced nail receiving openings.

17. In an electrical transmission system, the combination of a conductor arranged in an irregular path, and an enclosing and insulating molding formed of flexible material having a conductor receiving open groove extending longitudinally of the molding whereby the molding may be applied to the conductor in situ.

18. In an electrical transmission system, the combination of a conductor arranged in an irregular path, an enclosing and insulating molding formed of flexible material having a conductor receiving open groove extending longitudinally of the molding whereby the molding may be applied to the conductor in situ, and means to fasten the molding over the conductor.

19. In an electrical transmission system, the combination of a conductor arranged in an irregular path, and an enclosing and insulating molding formed of flexible material having a conductor receiving longitudinal opening along the exterior of the molding whereby the latter may be applied to the conductor in situ.

20. In an electrical transmission system, the combination of a conductor arranged in an irregular path, an enclosing and insulating molding formed of flexible material having a conductor receiving groove extending longitudinally at the exterior of the molding whereby the latter may be applied to the conductor in situ, and means to fasten the molding around the conductor.

21. In an electrical transmission system, the combination of a power line, supporting means therefor, a conductor arranged in an irregular path along the supporting means into the vicinity of the conductor, an enclosing and insulating molding formed of flexible material having a conductor receiving groove extending longitudinally of the molding whereby the molding may be applied to the conductor in situ, and means to fasten the molding over the conductor and to said supporting means.

ALFRED HERZ.